United States Patent [19]

Chiriatti

[11] Patent Number: 4,952,934
[45] Date of Patent: Aug. 28, 1990

[54] FIELD PROGRAMMABLE LOGIC AND ANALOGIC INTEGRATED CIRCUIT

[75] Inventor: Antonio Chiriatti, Reggio Calabria, Italy

[73] Assignee: SGS-Thomson Microelectronics s.r.l., Italy

[21] Appl. No.: 465,703

[22] Filed: Jan. 16, 1990

[30] Foreign Application Priority Data

Jan. 25, 1989 [IT] Italy ................. 8360 A/89

[51] Int. Cl.⁵ .............................. H03M 1/66
[52] U.S. Cl. ............................ 341/142; 307/125
[58] Field of Search .................... 341/126–142, 341/144; 307/96–99, 125–131

[56] References Cited

U.S. PATENT DOCUMENTS

| | | | |
|---|---|---|---|
| 3,940,673 | 2/1976 | Darlington | 341/142 |
| 4,380,006 | 4/1983 | Borisou et al. | 341/142 |
| 4,401,974 | 8/1983 | Jarrett et al. | 341/142 |
| 4,450,518 | 5/1984 | Klee | 341/142 |
| 4,833,472 | 5/1989 | Hanmappel et al. | 341/142 |

*Primary Examiner*—Vit W. Miska
*Attorney, Agent, or Firm*—Pollock, Vande Sande & Priddy

[57] ABSTRACT

A programmable logic and analogic integrated device comprises a programmable logic section capable of constituting by programming a state machine which beside producing output logic signals in function of input logic signals may drive a digital-analog converter (DAC), the analog signal generated by which is managed as well as other analog signals which may be respectively fed to a number of analog input pins of the integrated device by the said programmable state machine by means of a plurality of integrated analog switches which also permit the output of the analog signal generated by the DAC through a buffered analog output pin of the device. An integrated comparator (zero-crossing detector) provides a comparison between two distinct external analog signals or between an external analog signal and the analog signal generated by the DAC for producing an output logic signal which may be fed to an input of the state machine for implementing a certain interaction function.

The device is useful for a wide range of applications in lieu of a microprocessor based system.

2 Claims, 2 Drawing Sheets

FIELD PROGRAMMABLE LOGIC AND ANALOGIC INTEGRATED CIRCUIT

BACKGROUND OF THE INVENTION

1. Field of the Invention

The present invention relates in general to a field programmable logic and analogic integrated device and in particular to an integrated logic circuit programmable for substantially constituting a state machine capable of driving a digital-analog converter (DAC) and analog circuits which interacts with said state machine.

2. Description of the prior art

Programmable (and erasable) logic devices (PLD), based upon the use of EPROM or EEPROM cell arrays, are known and widely used for implementing on a single chip a large number of logic functions which would otherwise be normally implemented by "dispersed logic circuitry" needing a large number of normal, nonprogrammable, logic devices. PLDs represent powerful tools for implementing so-called "state machines". These in turn represent reliable general-purpose building blocks for constructing sequential digital systems, reducing the overall amount of logic circuitry needed. In particular state machines offer valid solutions for a wide range of control functions, for example, in complex interface systems.

There is however an area of applications for digital techniques wherein the "microprocessor" still appears a necessary choice. This is the case, for example, of control and/or regulation systems for analog functions or devices wherein analog signals must be converted by means of an analog/digital converter (ADC) into digital signals which may be read and processed by a microprocessor in order to produce digital signals which may, where necessary, be converted back into analog signals by means of a digital/analog converter (DAC). For a large number of applications, this architecture of control and/or adjustment circuits, though powerful and effective, is intrinsically wasteful because of its "rigidity", determined by the fact that the flow of signals through a microprocessor system is at any instant essentially monodirectional. The microprocessor because of the versatility which characterized it, may carry out a limited number of standard operations. Moreover this "rigidity" of a microprocessor control system implies a processing time which is often nonnegligeable for the objectives of the overall control system. Furthermore in many cases the use of such a powerful tool such a microprocessor appears entirely unjustified for the type of control operation to be performed and it is indicative to this respect the increasing demand for microprocessors with an extremely limited number of bits, which are sought for such relatively simple control or regulation systems.

OBJECTIVE AND SUMMARY OF THE INVENTION

Objective of the present invention is to provide a field programmable, logic and analogic, integrated device, for general-purpose utilization, which upon programming is capable of autonomously perform a desired control or "intelligent" interface and/or regulation function by being capable of receiving and delivering both analog type and digital type signals.

In a most essential embodiment the device of the present invention comprises a digital/analog converter (DAC) driven by a programmable state machine which may have an architecture similar to the one of a common PLD, comprising a programmable AND-level formed by an array of individually addressable and programmable memory cells, an OR-level (wired or programmable) cascaded from said programmable AND-level and a plurality of registers and/or latches necessary for implementing said state machine. The output of the digital/analog converter (DAC) may be made externally available through an analog output pin of the integrated device by means of an integrated switch driven by the state machine and an enableable output buffer. The device comprises further a comparator circuit (e.g. a zero-crossing detector) having two respective inputs which may be connected by means of integrated analog switches driven by the state machine, either to the output of the DAC or to a first analog input pin and respectively to a second analog input pin of the device, and the output signal produced by the comparator is fed to an input of the state machine. The state machine may have a certain number of dedicated outputs and inputs, i.e. a certain number of buffered input paths from respective pins of the device, substantially wired to respective inputs of the programmable AND-level (AND-array) as well as a certain number of buffered output paths from the OR-level to respective pins of the device and/or a certain number of bidirectional input/output (I/O) pins driven by means of respective input/output (I/O) circuits which are commonly formed by an input selection block followed by a block of registers and by an output selection block, as it is well known to a skilled technician.

The mixed logic and analogic programmable device of the invention combines the programmability potential of a PLD for implementing a certain state machine with the possibility to interact directly through one or more analog output pins and one or more analog input pins of the device with the real word by means of the DAC driven by the same programmable state machine and the comparator also controlled by the latter. As it may be easily realized by a skilled technician, the mixed digital-analog integrated device of the invention has outstanding flexibility properties, unknown to the devices of the prior art and which derive from the programmability and from the presence of said analog circuits and switches within the integrated circuit which confer to the device such an outstanding versatility making it useful for a large number of applications such as for example: for implementing converters having a peculiar conversion law or relatively simple digital control systems employing an analog feedback (e.g. a temperature control system using the switching ON and OFF of a heating resistor in function of a signal provided by a temperature sensor), for driving bipolar circuits through a peculiar voltage-period conversion law and for implementing "intelligent" interfaces with microprocessors and the like.

DESCRIPTION OF THE PREFERRED EMBODIMENT

Figure 1:
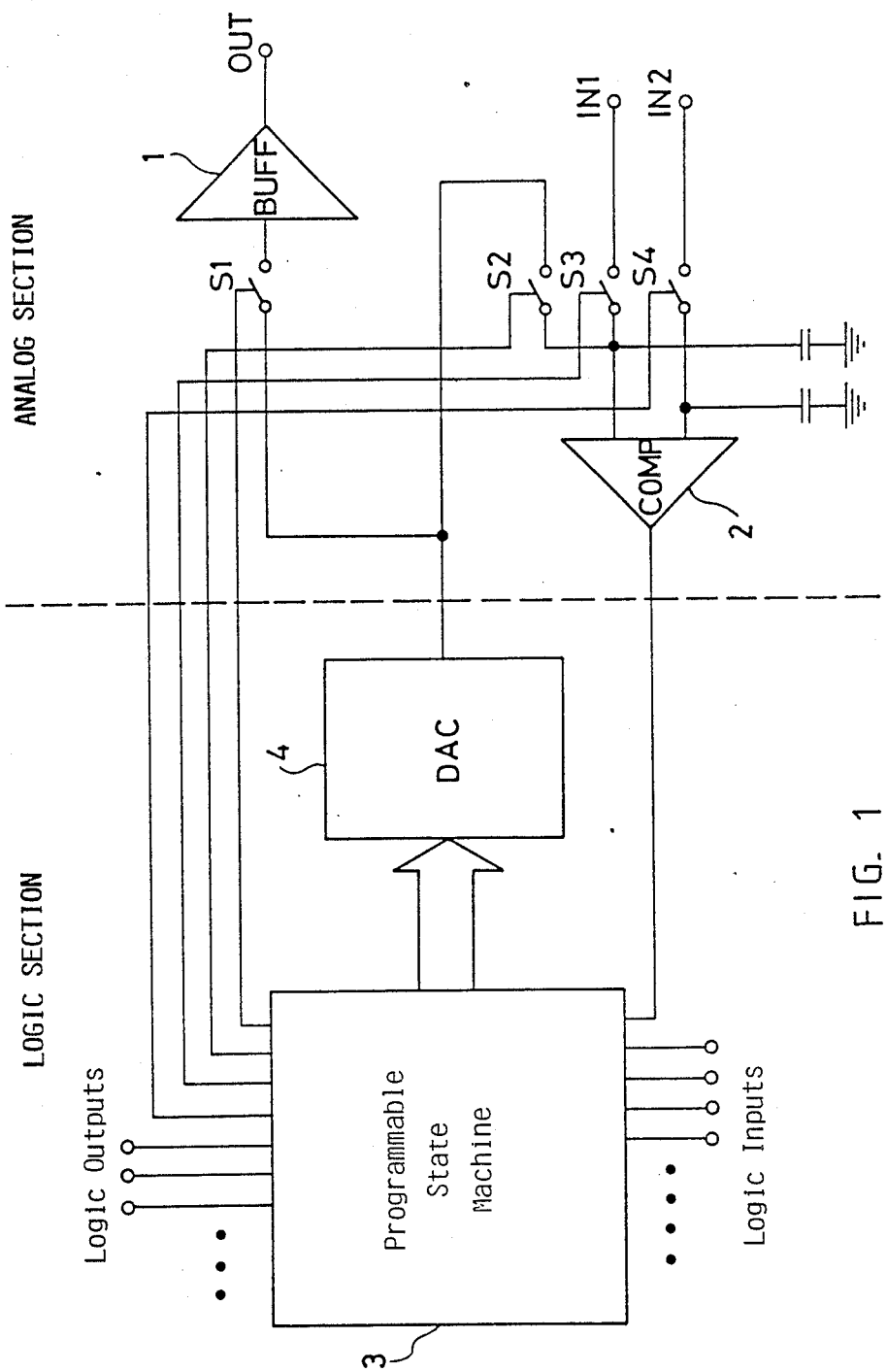
FIG. 1 shows the functional diagram of the field programmable logic and analogic integrated device of the invention according to a preferred embodiment thereof.

With reference to FIG. 1, the device of the invention comprises essentially a logic section and an analogic section. The logic section comprises a programmable logic circuit 3, apt to function as a state machine capable of performing certain logic processing in function of logic signals applied to a plurality of logic inputs thereof and of delivering output logic signals through a number of logic outputs thereof and of driving a digital/analog converter circuit 4 (DAC) in order to generate a resulting analog output signal. The analog section of the device of the invention comprises at least a comparator (e.g. a zero-crossing detector) 2, and preferably as in the case shown, also at least an analog output buffer 1, as well as a plurality of integrated analog switches S1, S2, S3 and S4. These analog switches are also driven by the programmable state machine and permit to select the path of the analog signals: the S1 switch enabling the output of the analog signal delivered by the DAC through the output analog buffer 1 (which may be also preferably enableable by the same state machine) and an analog output pin OUT; the switches S2 and S3 permitting to feed the same analog signal produced by the DAC and/or an external analog signal applied to an analog input pin IN1, to a first input of the comparator circuit 2; the switch S4 permitting to feed a second external analog signal applied to a second analog input pin IN2 to the second input of the comparator circuit 2.

The output signal of the comparator circuit 2 is directly fed to one of the inputs of the programmable state machine.

Therefore the integrated mixed device of the invention possesses a plurality of logic inputs, a plurality of logic outputs and a plurality of analog inputs and it may also be provided preferably (as in the example shown in the figures) with at least an analog signal output pin. As it will be evident to a skilled technician, also the pin or the pins for the output of analog signals from the integrated device may be easily configured as bidirectional input/output (I/O) analog pins (in the same way as bidirectional logic input/output pins) by providing the respective output analog buffer of these pins with enabling/disabling means and with an integrated "by pass" analog switch, all driven by the same state machine of the integrated device. In this way a single physical pin of the integrated device may function either as an analog output or as an analog input pin. By means of the comparator circuit 2 the analog section of the integrated circuit directly acts upon the programmable state machine.

In order to clarify better the interaction among the various blocks, a simple application of the invention in reference to a system for keeping constant the temperature of a certain enclosure by switching on and off a heating resistor, will serve as an example. The heating resistor could be advantageously powerable with two distinct supply voltages by means of two electrically controlled switches according to whether the temperature is lower or higher than a certain lower internal value; utilizing the high voltage supply for quickly approaching a value close to the set desired temperature and the low voltage supply for reaching and maintaining the set temperature.

For such a relatively common application the programmable integrated circuit of the invention may be easily programmed in order to implement a state machine capable of performing the following operations:

(a) loading into an input register of the DAC a digital data defining a certain interval of temperatures grossly lower than the desired temperature;

(b) closing the switch S2 while maintaining open the switch S3 in order to load the capacitance of the respective input of the comparator 2 to the desired level for a time sufficient for a sampling procedure;

(c) closing the switch S4 for a sufficient sampling time, in order to load the capacitance of the other input of the comparator 2 to a level corresponding to the analog signal coming from a temperature sensor and fed to the pin IN2 of the integrated device;

(d) closing through a relative output pin the high voltage supply switch of the heating resistor and repeating the sequence from step (a) if the temperature is comprised in said interval of temperatures or viceversa, if the temperature is outside said interval of temperatures, performing the following alternative sequence of steps:

(a') charging a digital data corresponding to the desired temperature in an input register of the DAC;

(b') closing the switch S2 while keeping open the switch S3 in order to load the capacitance of the respective input of the comparator 2 to the desired level for a sufficient sampling time;

(c') closing the switch S4 for a sufficient sampling time in order to load the capacitance of the other input of the comparator 2 to a level corresponding to the analog signal coming from the temperature sensor and which is fed to the pin IN2 of the integrated device;

(d') closing, through a relative output pin, the low voltage supply switch of the heating resistor if the temperature is below the desired value and restarting again from the step (a) or viceversa, if the temperature is equal to or higher than the desired value, none of the supply switches will be closed and the state machine will repeat again the sequence starting from step (a).

Of course at every clock's pulse the state machine will step forward from a state to the successive state, thus performing the desired control function.

Naturally, not only in the case of a relatively simple application such as the one described above, the normally vast processing capabilities of the programmable state machine may be exploited for performing a number of other duties by implementing other logic functions depending or not from the relative status of the output of the comparator 2, by utilizing the available logic inputs and outputs.

The control performed in the simple example described above, is a discrete type of control, however it is also possible to use the analog output pin (OUT) of the DAC for generating an analog control driving signal. In this case it will be obvioulsy necessary an analog type power interface between the device and the controlled heating resistance.

Figure 2:
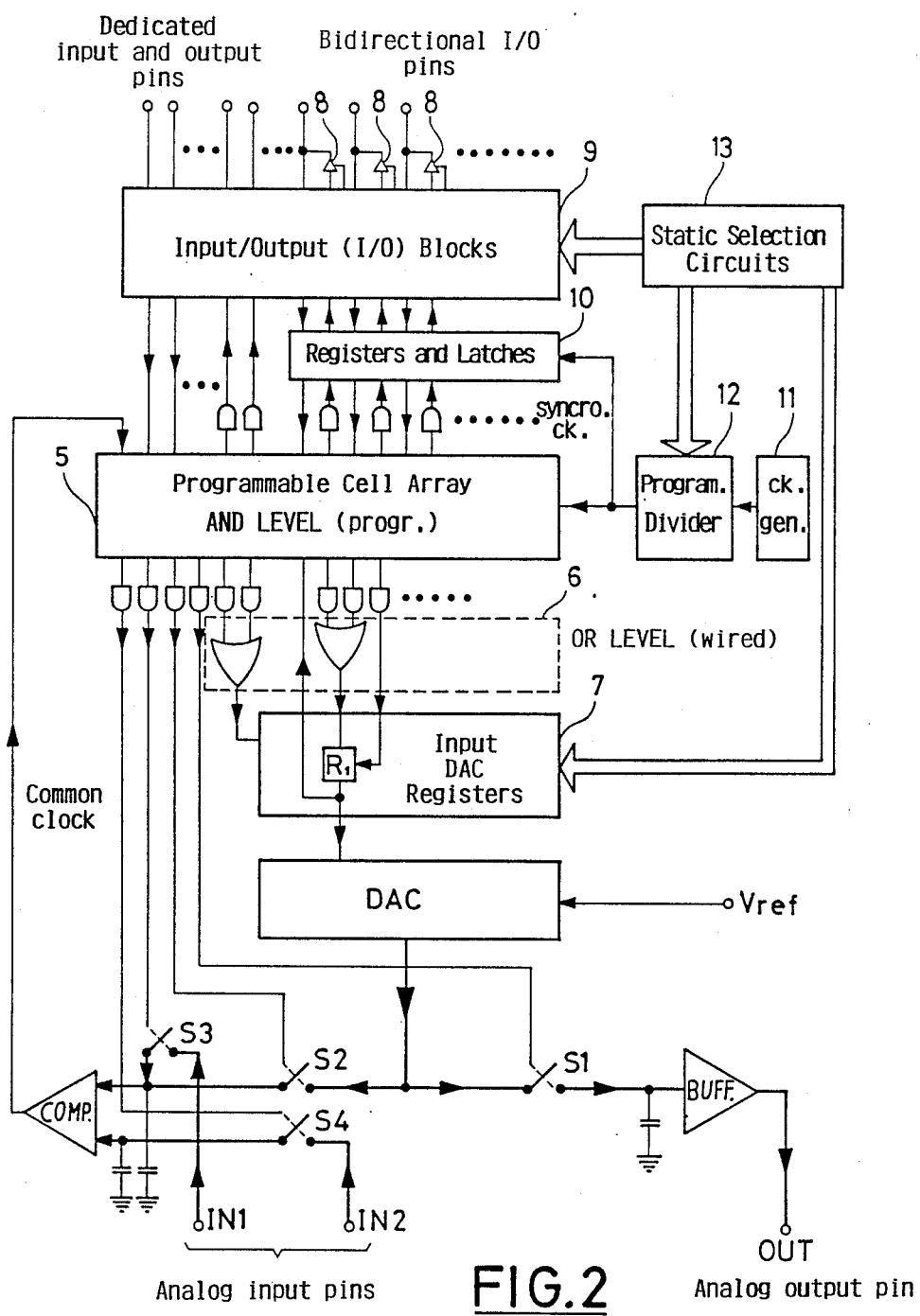
FIG. 2 is a more detailed functional diagram of the architecture of the programmable logic section of the integrated device of FIG. 1.

As schematically shown in FIG. 2, the logic section of the programmable integrated device of the invention, and in particular the section which more properly is usable for implementing a true programmable state machine, may have preferably a typical structure of a programmable logic device (PLD). An array 5 of programmable cells (EPROM or FLASH or EEPROM) constitutes a programmable "AND-level" the logic function of which is indicated by the graphic symbol, recognizable as a logic AND gate, depicted on each of the outputs of the AND-level shown in the figure. In the shown example, four outputs or product terms of the programmable AND-level respectively drive the four integrated analog switches S1, S2, S3 and S4 of the analog section of the integrated device of the invention (which is evidenced in FIG. 2 by showing the wired connections with a thick line). As typical of a large number of common PLD devices, cascaded from the programmable AND-level there is a fixed or wired "OR-level" 6, the logic function of which is schematically shown, in relation to two typical output signals of the AND-level, i.e. for a common clock signal and for a digital signal or bit being fed to a respective input register of the digital/analog converter DAC, by the logic symbol corresponding to the function of a logic OR-gate. The DAC converter is in fact driven by the programmable state machine through a series of input registers (flip-flop), one of which ($R_1$) is depicted within the block 7. A preset conversion reference voltage Vref is selectively fed to the DAC converter.

The management of the input and output logic data to and from the state machine (i.e. the programmable PLD section of the device) may take place through a plurality of input and output pins, suitably buffered, and/or by means of a plurality of bidirectional input/output (I/O) pins, each being provided with an enableable output buffer 8 in order to force an output logic signal. In particular, bidirectional I/O pins are managed by means of an equal number of input/output circuit, generally depicted in FIG. 2 by the block 9. The output logic signals of the AND-level which are directed to as many bidirectional I/O pins are necessarily fed to the respective input/output circuits by means of flip-flop registers or latches, which are generally indicated by the block 10 in FIG. 2. Each input/output circuit is commonly formed by an input selection block, followed by a block of registers and finally by an output selection block, the functions of which may be selected (i.e. programmable as the cell array forming the AND-level). These I/O circuits or blocks are amply described in literature and are well known to the skilled technician and therefore a reiterated description thereof is not necessary. Notably these programmable I/O blocks enormously increase the possibility of exploiting the programmable resources of the PLD section. The I/O blocks represent additional "static" programmable resources which permit to easily implement "feedback" paths of signals coming from and directed to the programmable cell array.

Furthermore the system is provided with a clock signal generator 11 and preferably also with a programmable divider circuit 12.

The required select signals for the various I/O blocks, as well as for the programmable divider 12 and for the input registers of the DAC converter are produced by means of a programmable static selection circuit 13. This circuit is formed in practice by a plurality of identical circuits each capable of taking one or the other of two different static operating conditions in function of the status of an EPROM or FLASH or EEPROM cell present in the circuit.

The prior Italian patent application No. 22219 A/8-8filed on Oct. 6, 1988, (corresponding to U.S. patent application Ser. No. 411,661 filed on Sept. 25, 1989) by the present applicant, describes a particularly advantageous type of such static selection circuits employing a pair of series connected programmable cells wherein one of the cell is conducting and the other nonconducting. The description of such a static selection circuit is here incorporated by express reference to said prior patent application.

As it will be evident to the skilled technician, the programmable, mixed logic and analogic device of the present invention may also be "duplicated", in the sense of being provided with two or more DAC and/or two or more comparators (zero-crossing detectors), whereby each one of them may receive analog signals coming from distinct analog input pins which may be suitably switched by the integrated programmable logic section of the device. The programmable logic section of the integrated device may also have a substantially different architecture from the normal architecture of a PLD, such as the one described above with reference to the example depicted in FIG. 2. For example, the programmable logic section of the integrated device may contain a second array of programmable cells forming an OR-level, which is also programmable, or this second array may be used as a multilevel logic (outputs of product terms fedback to the inputs).

What I claim is:

1. A programmable, logic and analogic, integrated device which comprises:

a programmable logic circuit having a plurality of logic inputs which may accessed through dedicated logic input pins and/or bidirectional logic input/output pins of the device and having at least an input capable of receiving an internally generated logic signal, the programmable logic circuit being configurable by programming as a state machine capable of performing a certain logic processing in order to generate output logic signals in function of logic signals fed to said logic inputs;

at least a digital-analog converter driven by output logic signals generated by said programmable state machine and stored by a plurality of input registers of said converter and capable of producing an analog signal at an output thereof in function of said driving logic signals;

at least a comparator having a first input, a second input and an output, said first input being connectable to the output of said digital-analog converter or at least to a first analog input pin of the integrated device by means of a first and at least a second integrated analog switches driven by said state machine, said second input being connectable to at least a second analog input pin of the integrated device by means of at least a third integrated analog switch driven by said state machine;

the output of said comparator being connected to said input of said state machine capable of receiving said logic signal internally generated by said comparator;

said comparator being capable of generating an output logic signal in function of the result of the comparison between two analog signals respectively fed to said two inputs by means of said integrated switches driven by said state machine, said output logic signal generated by the comparator constituting an input logic signal of said state machine.

2. The device according to claim 1, which comprises further at least a fourth integrated analog switch driven by said state machine capable of connecting the output of said digital-analog converter to the input of an analog output buffer having enabling/disabling means controlled by said state machine, for delivering said analog signal generated by said converter to an analog output pin of the integrated device.

* * * * *